Figure 1:
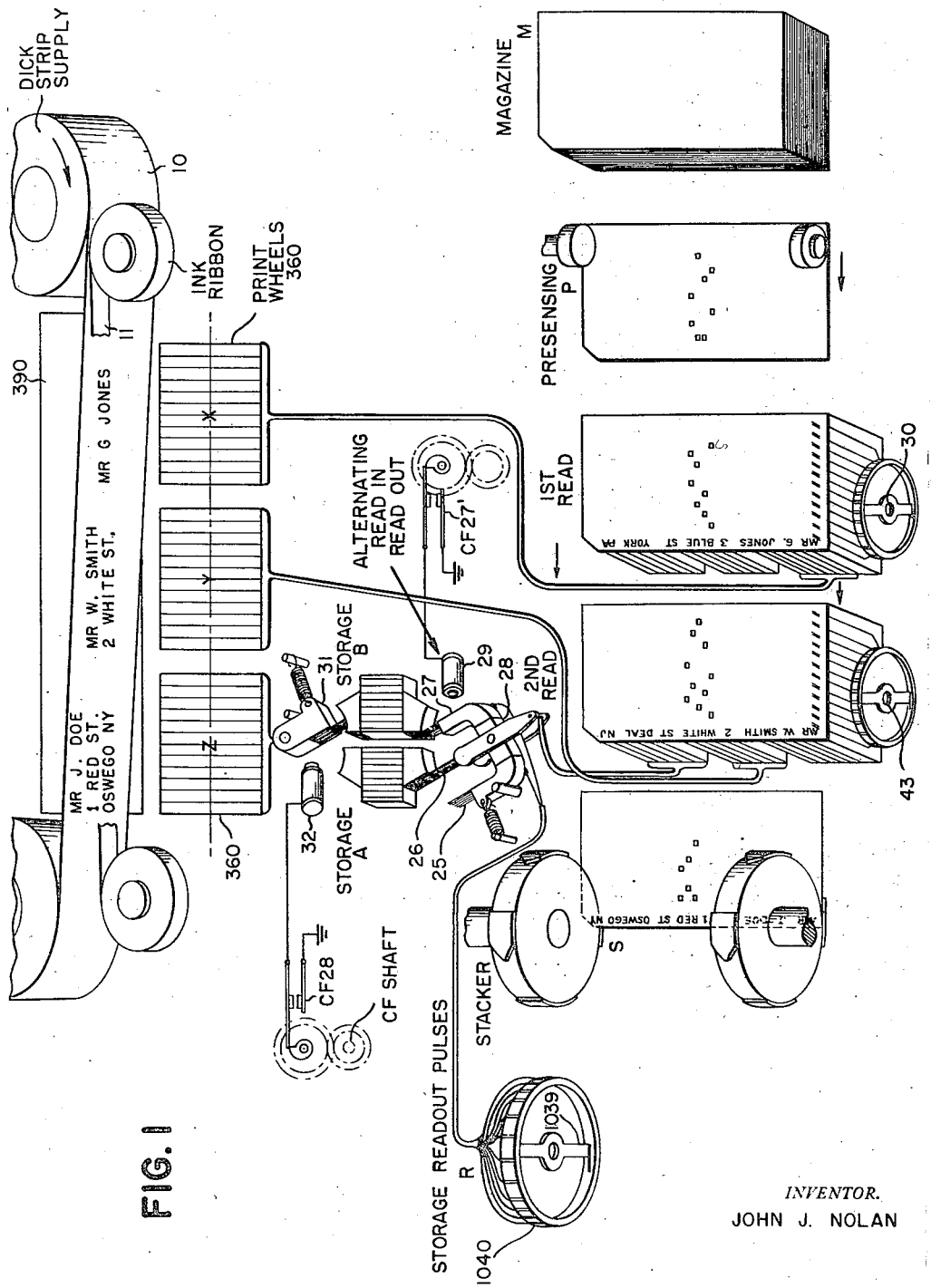

Nov. 13, 1956

J. J. NOLAN 2,770,188

DICK STRIP PRINTER

Filed Dec. 6, 1952

8 Sheets-Sheet 5

INVENTOR
JOHN J. NOLAN

BY
J W Armbruster
ATTORNEY

Nov. 13, 1956     J. J. NOLAN     2,770,188
DICK STRIP PRINTER

Filed Dec. 6, 1952     8 Sheets—Sheet 6

*INVENTOR.*
JOHN J. NOLAN

BY *J W Armbruster*
*ATTORNEY*

Nov. 13, 1956 J. J. NOLAN 2,770,188
DICK STRIP PRINTER
Filed Dec. 6, 1952 8 Sheets-Sheet 8

INVENTOR.
JOHN J. NOLAN
BY J. W. Armbruster
ATTORNEY

United States Patent Office 2,770,188
Patented Nov. 13, 1956

2,770,188

DICK STRIP PRINTER

John J. Nolan, St. Albans, N. Y., assignor to International Business Machines Corporation, New York, N. Y., a corporation of New York Application December 6, 1952, Serial No. 324,563

16 Claims. (Cl. 101—93)

This invention relates generally to printing and record feeding devices and more particularly to means for printing addresses on a web of record material such as a narrow dick strip under control of an alphabet printing tabulator.

An object of the invention is to provide devices for recording address lines of print at a rapid rate on a strip of record material.

Another object of the invention is to provide means for printing a continuous address tag record under control of tabulator record cards bearing indicia representing plural parts of address identifications.

Many large business firms and institutions such as banks, insurance companies, utilities, etc. have files of perforated tabulator cards bearing name and address indicia of employees and customers which are ordinarily used for general accounting purposes such as payroll, billing, investment accounting, divided check printing, etc. Recording from such cards is ordinarily accomplished in conjunction with figuring work to calculate net wages, total charges and other figures involving mathematical handling of numerical data appearing in conjunction with the name and address data. Ordinarily such tabulator printing is at the rate of only one line per machine cycle, but since such print is exceptionally wide and includes the calculations a relatively slow rate of speed is justified. However, such speed would be too slow for producing address strips for mailing purposes. Therefore, while it is desirable to use the system of name and address cards already in existence for an additional purpose it is also quite necessary to provide some way of speeding up the process of printing when directed to addressing per se where the numerical or accounting part of the card data does not enter into the operation. For that purpose the present invention satisfies a longfelt want in providing means whereby three or four address lines may be printed simultaneously from a succession of record cards through the full utilization of the entire range of print capacity of a machine such as a tabulator which ordinarily includes from 100 to 120 separately adjustable printing members arranged in a single line across the width of the printer unit of the machine. The full employment of the printing members is made possible by the present improvement by subdividing the 120 positions of printing across the tabulator into equally spaced groups and using them simultaneously for separate address parts of different addresses, such as by printing the name of one, the street identification of a second and the city and state identification of a third. In order to do this the narrow address strip or tape is arranged diagonally across the printing line with the strip length running along the length of the printing line and within the range of the full width of the printer unit and arranged so that the several different portions of impressions fall along the length of the strip and on different line space positions. The angle of inclination of the strip from the horizontal is such that when the strip is advanced a space equivalent to the spacing of the separated groups of the aligned type members, the printed address line of one portion is not only advanced but also elevated one line space with respect to the printing line. Therefore, while the strip is only advanced the length of one address portion for each cycle, it has printed thereon three, four or more address lines simultaneously on several adjoining tags and thus a complete multiple line address portion or tag is printed on each tabulator printing cycle with a gain of time which is threefold or more.

Another object to the invention is to provide means for feeding a narrow address strip diagonally across the common printing line of a plurality of groups of printing devices so that more than one impression and more than one line of address print may be impressed thereon at a single printing operation.

Another object of the invention is to perforate the strip or web with registering holes coincident with the printing operation so that accurate registration is possible thereafter.

Another object of the invention is to provide a pin feed or sprocket wheel feeding means cooperating with the perforated address strip material to accomplish accurate spacing between address printing operations.

A further object of the invention is to provide a novel method of printing and record feeding including the steps of subdividing and spacing groups of settable print members along a single horizontal line and then directing and accurately spacing a web diagonally across said spaced groups of print members at such an angle that several horizontally spaced address lines are advanced and elevated one line space vertically with each horizontal movement of the web to adapt it to receive a plurality of address line printing impressions on each printing cycle.

A still further object of the invention is the provision of an address strip as an article of manufacture whereon successive and equally spaced address impressions are composed of lines of print so inclined with respect to the edges of the strip that if said lines are projected longitudinally they fall in adjacent addresses one line space removed from the position occupied in the related address group.

A further object of the invention is the provision of a plurality of storage devices coordinated with address card sensing devices so that address portions entered therein under control of the cards are stored for one or more cycles and read out thereafter and directed to control printing in coordination with the printing of other address portions. By means of the provision of such storage devices it is possible to limit the number of card sensing stations and yet provide for the reading of a plurality of address portions from one card simultaneously and later control printing from storage independently of readings taken directly from the card to the printing mechanism. Alternating devices are provided to coordinate the readings in and out of storage so that while an address part is being read into storage from one card, another address portion may be read out of storage relating to another card.

Other objects of the invention will be pointed out in the following description and claims and illustrated in the accompanying drawings, which disclose, by way of examples, the principle of the invention and the best mode, which has been contemplated, of applying that principle.

Figure 2:
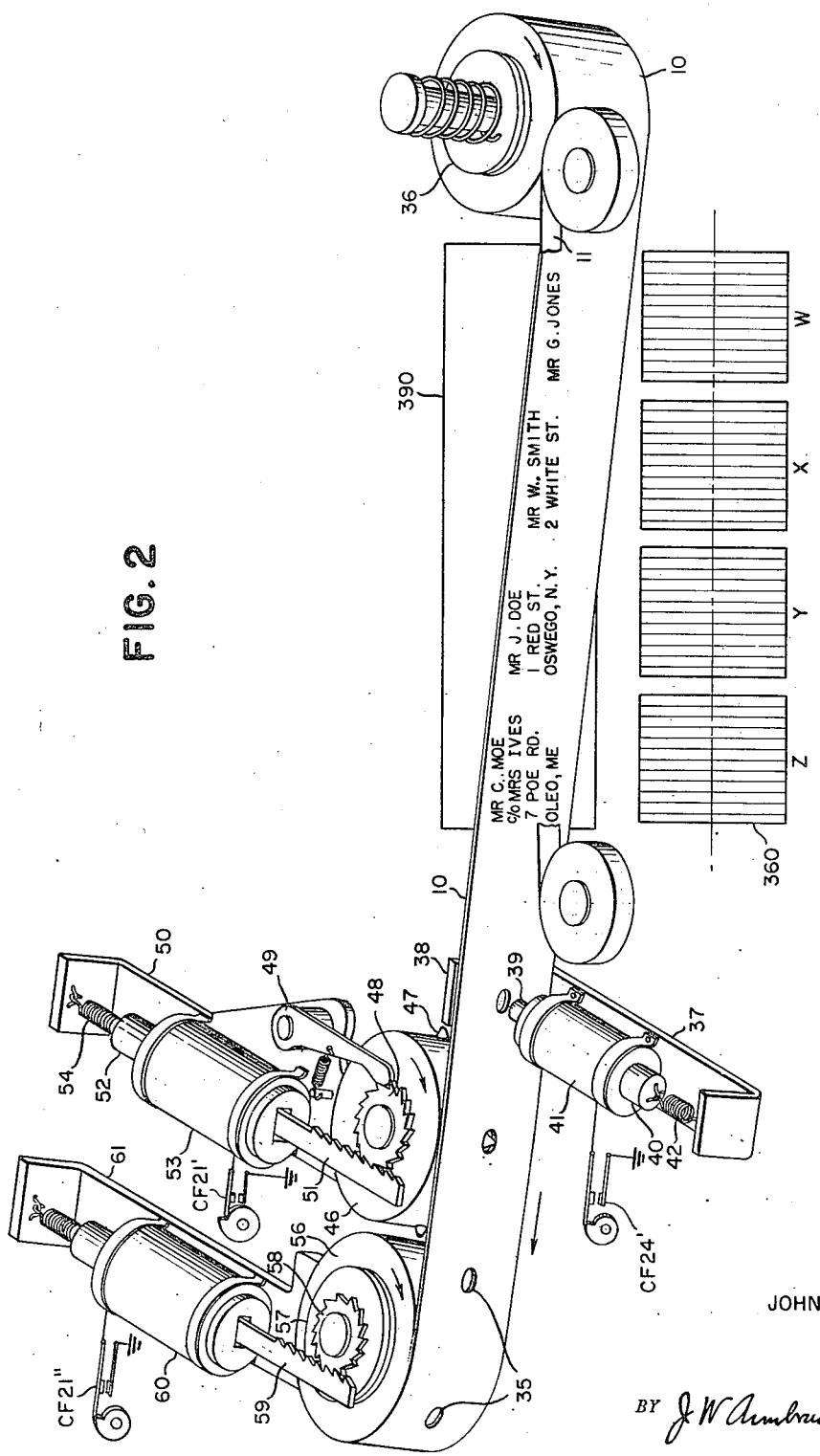
Figure 3:
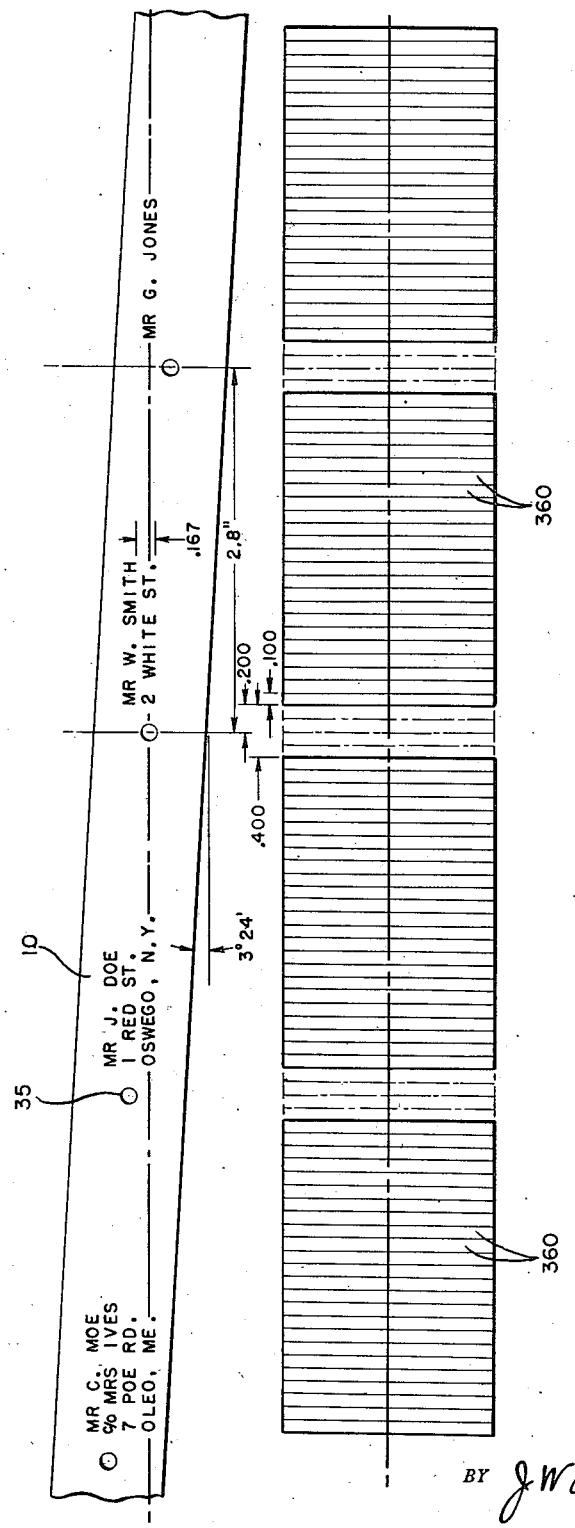
Figure 4:
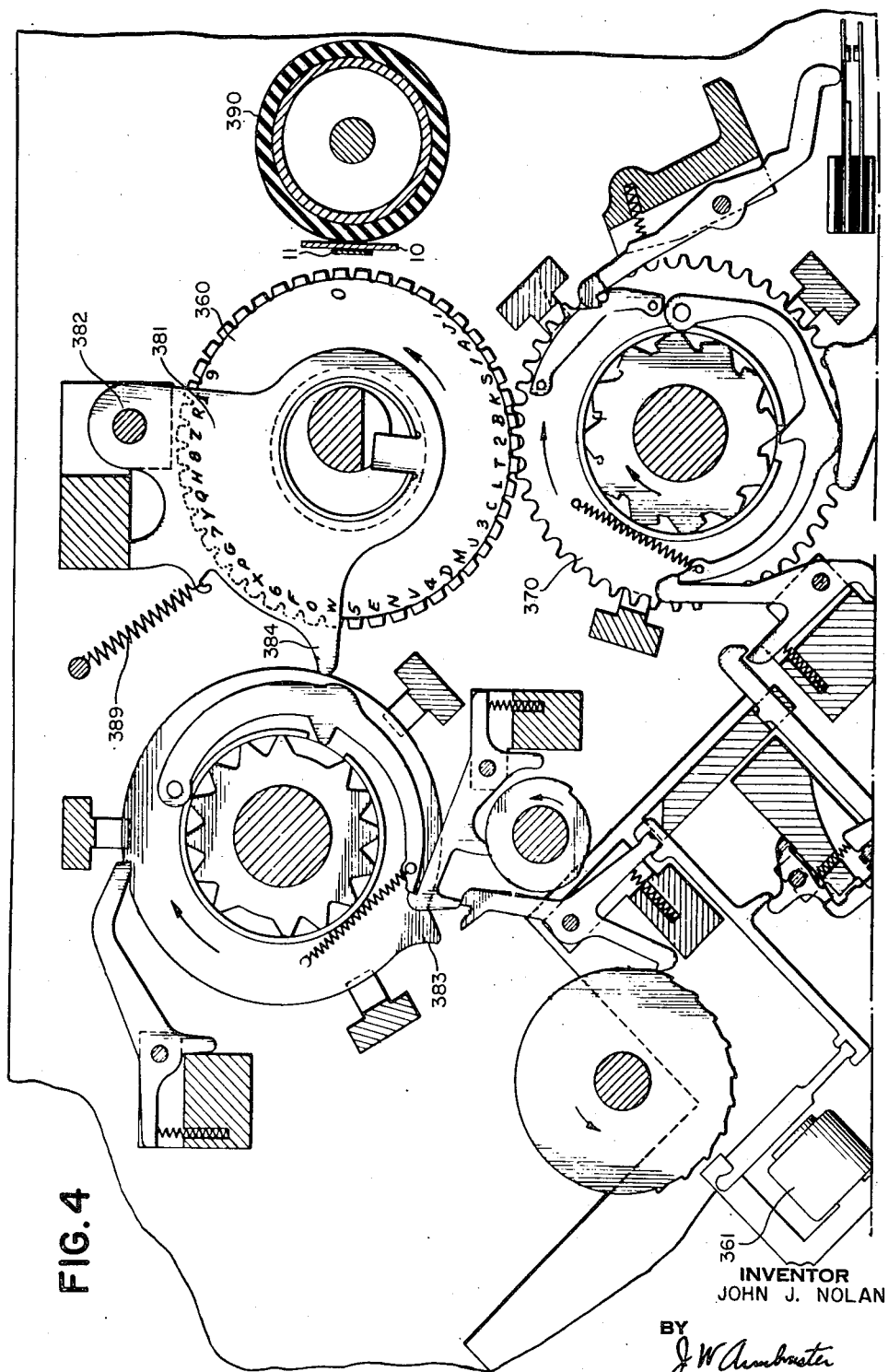
Figure 5:
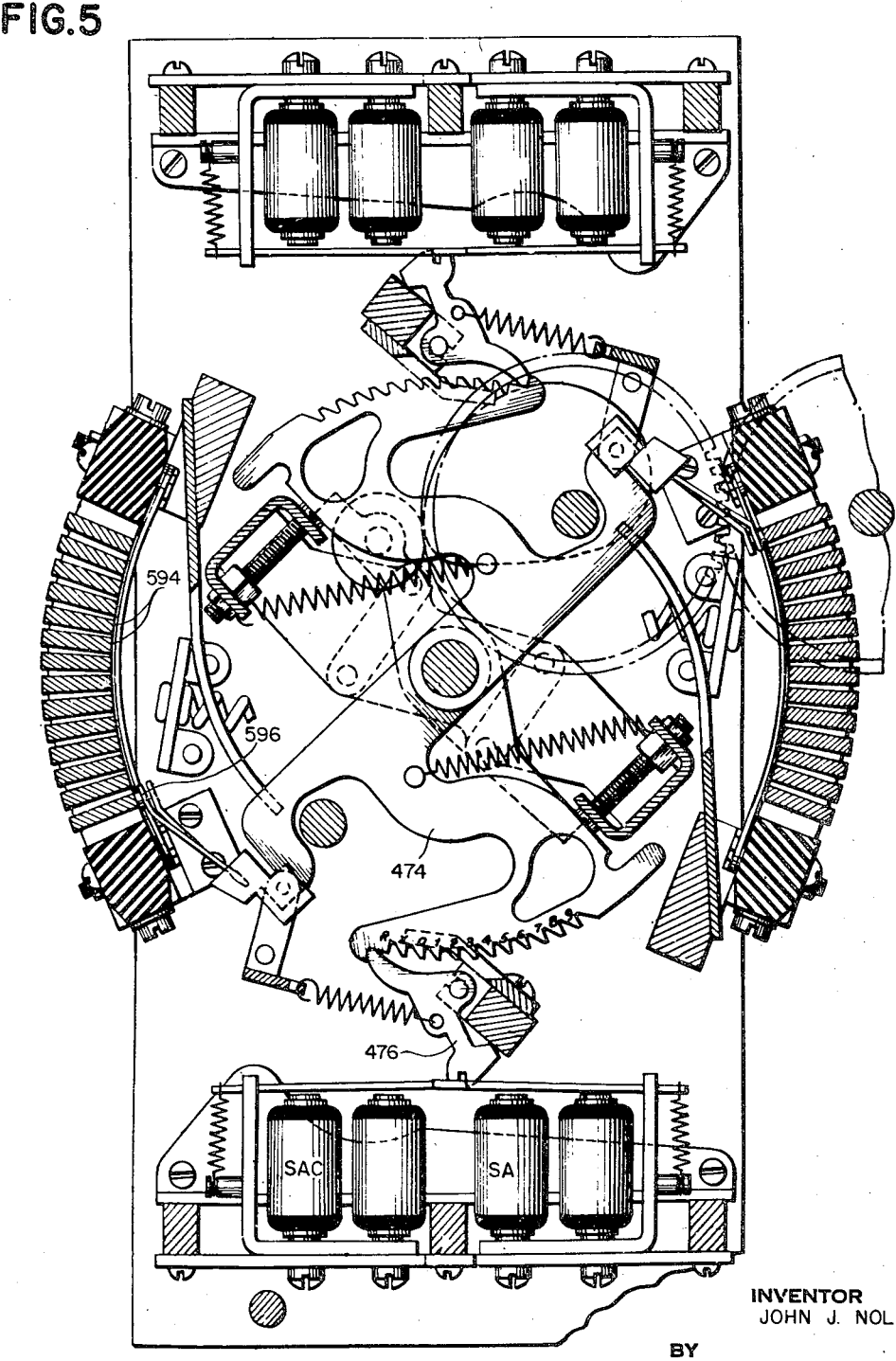

In the drawings:

Fig. 1 is a diagrammatic view showing the arrangement of address printing control cards passing through two sensing stations, and the way such sensing is related to the operation of storage devices and the control of groups of adjustable printing wheels in cooperation with an address strip directed diagonally across the printer, Fig. 2 is a perspective view showing the printing, punching and record feeding devices cooperating with the address strip material, Fig. 3 is a plan view showing a portion of a printed address bearing strip as it is proportioned and related to a plurality of sets of the adjustable type members, Fig. 4 is a sectional elevation view showing the printing mechanism as it is associated with the inking ribbon, address strip and platen, Fig. 5 is a sectional elevation view showing the storage mechanism, Figs. 6, 7, 8 and 9 are diagrammatic views showing the various arrangements of card sensing and storage units which are controlled so that the numbers of lines of print may be increased beyond three or four and at the same time the number of card sensing stations may be decreased so that sensing stations are not necessarily paired with the groups of printing members but may be operated independently thereof through the storage devices.

For purposes of illustration the invention is shown in connection with an alphabet printing tabulator of the kind disclosed in the patent to Rabenda 2,569,829, filed May 3, 1949 and issued October 2, 1951. This patent illustrates the main components of a tabulator known as the IBM "407" alphabet printer with storage. Heretofore, it was used primarily for printing address and accounting data on wide record material advanced vertically with respect to the printing unit. Also of note is the copending Beattie et al. application, Serial No. 74,424, filed on February 3, 1949, for a record controlled printing machine, now U. S. Patent No. 2,687,086.

Reference to Fig. 1 shows that in the present instance a narrow strip or web 10 of address receiving material is advanced diagonally across the platen P and behind an inking ribbon 11 arranged in the usual fashion parallel and coincident with the printing line across the printer of the tabulator in front of a plurality of separately adjusted type wheels or printing elements 360. In accordance with one phase of the present invention it is noted that the printing type wheels 360 are subdivided into three groups X, Y and Z, said groups involving wheels equal in number and equally spaced by the omission of control from a number of the printer controls cooperating with several of the printer wheels interspersed between the different groups and left at a blank position so that blank spaces result between the address portions. In other words, the blank spaces between address strip portions, which are later used for locating perforations, are caused by the omission of control over several interspersed groups of printing wheels.

The lower portion of Fig. 1, reading from right to left, shows the advance of perforated record cards singly and successively out of the magazine M at the right and then through a presensing station P and successively through a first reading station, a second reading station and then to a stacker. This is all described in detail in the Rabenda patent mentioned hereinbefore and it is sufficient to state here in connection with showing in Fig. 1 that when the record card appears at the first reading station the electrical sensing devices therein cooperate with the card portion devoted to name data perforated therein and such sensing portions are connected to the first group of address printing members at the right of the printer and allocated to the task of printing the "name" portion of each address.

When the same card advances further through the card feeding unit and is carried over to the left into the second sensing station there two portions of the card are read, the one devoted to street identification being directed directly into the Y portion of the printer which is the middle group and devoted to the part of the address print relating to the second or "street" line of each address. Meanwhile the third card portion relating to city and state identifications is being read into one of the two storage devices and as shown is directed into storage unit A which at the time is not connected to the Z portion of the printer but instead the storage device B which has been previously set up by the preceding card is being read out under control of an impulse emitting or directing device R which is provided in the tabulator for directing a regular stream of timed read out impulses through the storage devices in coordination with the adjustment of the printer so that the alphabetic and numerical data stored therein is used to adjust the printing wheels so that the impressions therefrom are equivalent to the data taken off the record card in the first place.

Now that it has been explained how the three different printer portions shown in Fig. 1 are adjusted in three different ways, all derived from a single record card bearing all three address portions, it is also to be noted that said address portions are read into the printer at different times as interspersed between the reading into the printer of address portions of other adjacent cards while said cards are being directed in succession through the sensing means of the tabulator. There results on the address strip the appearance of print as shown in Fig. 1 where it is seen that the name data of one card appears at the right simultaneously with the impression of the street data of a second card in the middle and along with the city and state identification of a third card impressed at the left. It is noted there that the name Jones and the street identification White and the city identification of Oswego are in horizontal alignment and that they are printed simultaneously from the printing wheel groups adjusted in accordance with three different successive cards so that the equivalent of one full address is printed simultaneously by the recording of all kinds of address portions relating to different addresses. However, as the strip 10 is advanced to the left and diagonally upward, the name portion is not only moved to the left but also elevated so that the appearance is such as that indicated in the middle address wherein the Smith name previously printed while the Smith card was at the first reading station is now elevated one line space above the print line of the middle set of print wheels which are adjusted by the same card in the second reading station to cause the printing of the Smith address line which is written as 2 White Street.

At the left there is a complete three line address on the strip which is the product of one card resulting after three successive sensing operations in connection with that card, two of said sensing operations coming out of the card reading stations and the third coming out of the storage unit B which was previously adjusted while the card was at the second reading station.

There results from the successive impressions of three different address portions and the diagonal elevation of the strip, a complete three line address printed for each tabulator printing cycle. It will be pointed out hereinafter how, by the employment of different numbers of storage units and different numbers of sensing stations, it is possible to print more than three lines of address print from one or more card sensing stations on each operating cycle of the tabulator.

The showing of the connections to and from storage devices A and B is diagrammatic of plural contacts shifted by magnets to provide alternation of read in from the cards with read out to the printer. Three sets of contacts 25, 26 and 27 are mounted on a common pivoted insulation frame 28 which is rocked on every other cycle by a magnet 29 that is energized through cam contacts CF27′ (similar to contacts CF27 of the patent mentioned) during the card read portion of every other cycle. Reduction gears reduce the speed of the CF cam shaft and motion of cam contacts CR27′ by half to be effective only on alternate cycles.

While the city identification is being read off the record card at the second reading station and directed through contacts 26 into storage device A, that storage device is disconnected from the printer Z. At the same time, the emitter R is connected to storage device B, which holds the city identification of the first card, and through closed contacts 27 and 31, the data in storage device B is read into the printer part Z and used to set the wheels 360 to record the city and state portion of the first address; i. e. the one at the left of the dick strip 10. On the next cycle, the positions of the contacts are changed so that contacts 25 (also connected to readout emitter R) are connected to storage device A while contacts 26 are connected to storage device B, and contacts 31 are connected from printer Z to storage device A. Thus, there is a steady alternation of control to and from the two storage devices in order to effect three readings from each card although there are only two reading stations.

Before going further into the nature of the dick strip feeding and printing devices, it is believed well to describe briefly the illustrative forms of printing and storage devices found in Patent 2,569,829 already mentioned. Referring to Fig. 4 it is seen that the printing wheels 360 are individually mounted to swing from pivot 382 and be adjusted by gear 370 before being swung to the right against platen 390 to effect a typed impression through the ink ribbon 11 and upon the dick strip 10. The printer control magnets 361 are energized differentially to control the positioning and shifting of the type wheels 360 through the mechanism associated therewith and described in detail in the patent.

For an understanding of the storage device, reference is directed to Fig. 5 where it is seen that sectors such as sector 474 are adjusted differentially and held by pawls 476 which are operated by magnets SA and SAC, the former being effective for storing the 9—1 or digital part of the alphabetic code data from the cards, and the latter for storing the O, X, R code portions of the alphabet data. Associated with each sector are storage contact devices or impulse emitting controls in the form of movable contact wipers 596 fastened to the ends of the sectors and movable into contact with different ones of the fixed commutator segments 594. These differentially set contacts are provided as an electrical setting means whereby regularly timed impulses may be directed through them to take off a reading of the address portions set up in storage to control grouped sets of printer wheels.

The print control pulses are directed through the readout emitter R, Fig. 1, connected in multiple to the contacts 25 and 27 either of which contact alternately and respectively to the readout emitters of storage groups A or B, and thence through alternately connected contacts 31 to the print control magnets 361 of the common print wheel group Z. The combination of controls exercised by the pulsed print magnet serves to control the printing of a letter which corresponds to that derived from the perforated card and set up in code in the storage unit by the action of control magnets SA and SAC.

In Fig. 3 the dick strip 10 is shown in actual proportions as related to grouped type wheels 360 of an IBM "407" tabulator. Assuming that twenty-four type wheels are in each group for control over the printing of an address portion, and that such groups are separated or spaced by four idle type wheels, then since each print position requires a width of .10 of an inch, the total dick strip unit length=24×.10+4×.10=2.8 inches. These proportions require that the strip be advanced diagonally upward about 3° 24' in order that a printed address line may be elevated the usual line space distance of ⅙ of an inch when shifted from one type group to another. A strip width of about ⅞ of an inch is found sufficient for most address requirements. In the unused strip space between addresses there is punched a centralized locating hole 35 which is accurately spaced along the strip and used for advancing the strip definite successive steps between printing impressions. Since the tabulator operates at the rate of 150 cards per minute there is an output of 9,000 complete addresses per hour.

The view Fig. 2 shows in a diagrammatic fashion the punching and feeding devices cooperating with the dick strip 10. At the right end the supply reel or roll is provided with a spring pressed clamp disk 36 for frictionally engaging the center of the supply roll so that the strip is held taut and prevented from being overthrown when the strip is drawn to the left.

After the strip 10 passes at an angle through the space between the platen 390 and the ink ribbon 11, and in front of the several groups of print wheels 360, it is drawn through a punching device. This device is supported on a bracket 37, the rear wall 38 of which is formed with a die opening to receive the punch end 39 of a solenoid plunger 40. Surrounding the plunger is a solenoid 41 which is fastened to bracket 37. A spring 42 tends to hold the plunger 40 retracted normally with the punch out of the die. While the strip is stationary; i. e., during printing or immediately thereafter, cam contacts CF24' close in series with the solenoid 41 to energize it and thus slide the plunger 40 rearward to punch the strip.

After printing and punching have been effected, the strip 10 is ready to be advanced to the left one sectional spacing to be positioned accurately in readiness for the printing of a new line of the several address parts. A sprocket wheel 46 is loosely mounted on a vertical pivot and formed with extending pins 47 spaced at quarterly intervals to engage the holes 35 formed in the strip by the punch. Since the wheel 46 is advanced an invariable distance on each feeding stroke the strip is also fed accurately. A ratchet wheel 48 is fastened to the top of the pin feed sprocket wheel 46 and is formed with teeth numbered in a multiple of four. A spring drawn retainer arm 49 is pivoted on the frame 50 and has a rounded end pressing in the ratchet teeth recesses to limit and hold the sprocket movement to an even amount of spacing. In order to drive the ratchet wheel 48 there is associated therewith a ratchet rack 51 which is the extension of the plunger 52 in the solenoid 53. After printing and punching have been effected with respect to one operation of the tabulator, cam contacts CF21' are closed and solenoid 53 is energized and plunger 52 is projected forward against the tension of spring 54 with the teeth of rack 51 ratcheting idly over the teeth on wheel 48. However, after the plunger is brought against a fixed stop (not shown) and the solenoid 53 is deenergized, spring 54 pulls the plunger 52 back against another stop and during such movement the rack 51 rotates the ratchet wheel 48 and sprocket wheel 46 one quarter turn in a clockwise direction and thus the dick strip 10 is advanced to the left for just one address portion length in an accurate fashion.

A takeup roll 56 is provided for winding the printed length of disk strip 10 after it leaves the printer, punch and feeder. Cooperating with the center of roll 56 are frictional disks 57, the top one bearing a ratchet wheel 58. As a driver for wheel 58 there is provided a ratchet rack plunger 59 in a solenoid 60 which is mounted on a bracket 61. Timed to operate shortly after the closure of contacts CF21', cam contacts CF21" are made effective to energize solenoid 60 and thus plunger rack 59 is extended and retracted to rotate roll 56 in the same fashion as the operation of sprocket wheel 46. As takeup roll 56 is turned impositively in a clockwise direction it takes up whatever slack there is in strip 10 between the roll and sprocket wheel 46.

Although Fig. 1 shows only three printer sections X, Y and Z opening on a dick strip 10, it is apparent from Figs. 2 and 3 that there are times when it is desired that four such sections be provided. The same principle of operation of printer sections operating on a diagonal strip may be carried out to greater lengths with various arrangements of printer sectionalizing and other degrees of strip inclination. Other variations may be produced by expanding or reducing the number of card reading stations and storage units used. For example, should three successive card sensing stations be provided then it is obvious that no intermediate storage is needed for a three line address print, but direct readings may be taken from all three cards at once. On the other hand, should only one card reading station be provided, it is still possible to effect impression of a plurality of different address portions by the employment of sets of storage units in tandem and in series. Several such arrangements are shown in Figs. 6-8 with various numbers of card reading and storage stations and varying resultant lines of print.

Figure 6:
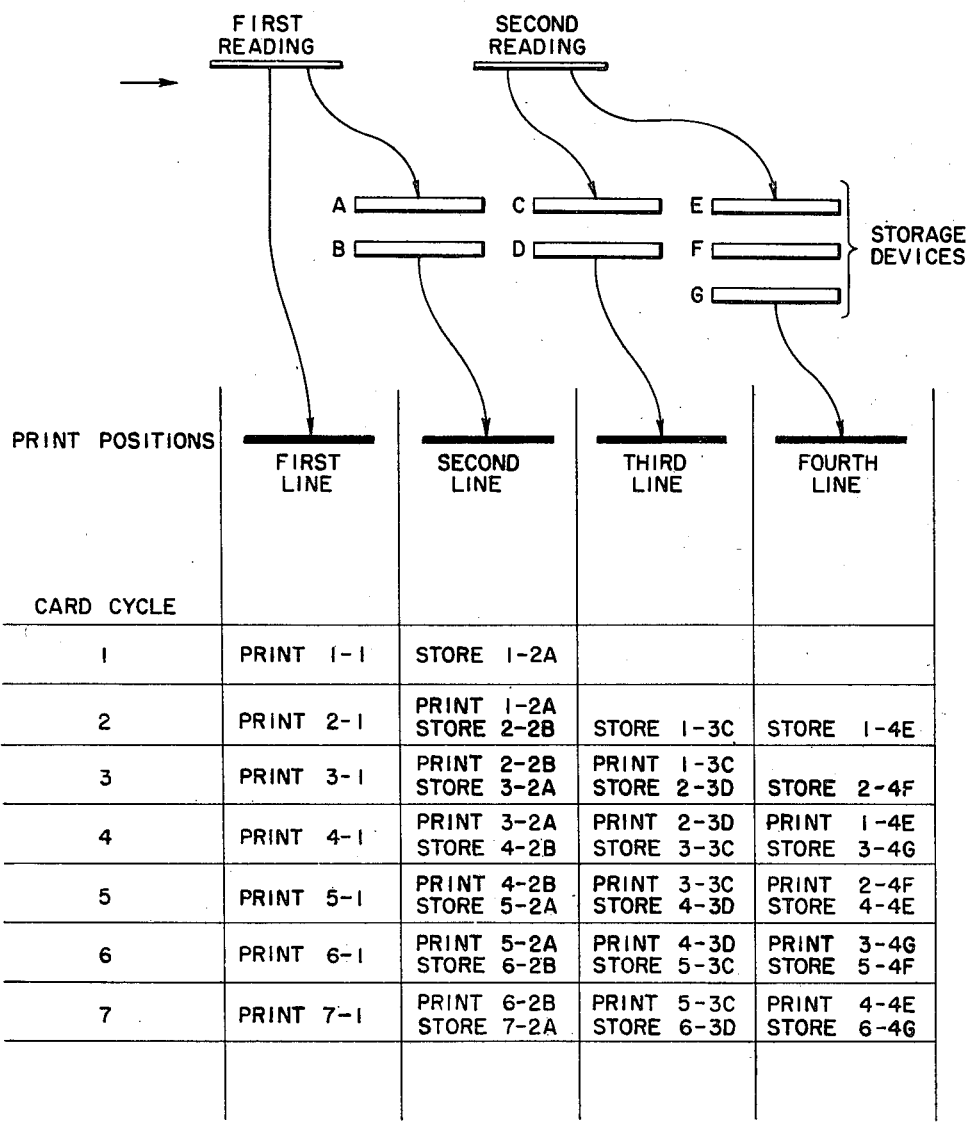

In Fig. 6 it is assumed that a card bears four address portions and is analyzed at two fields at each station in passing through two sensing stations.

In order to print four address lines at a time, seven storage units are needed and the address parts are read into and out of them sequentially as designated opposite the card cycle intervals for seven successive cards.

Figure 7:
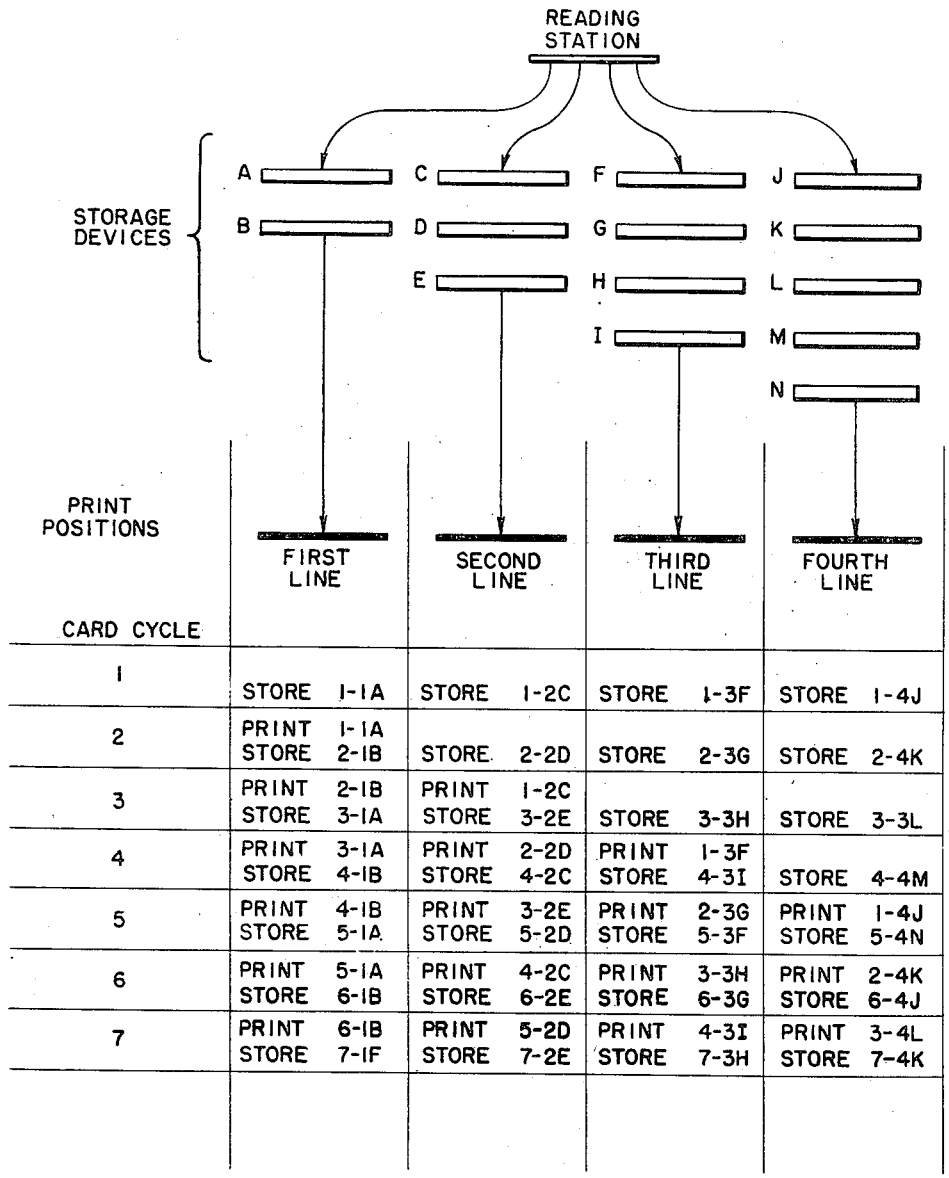
Figure 8:
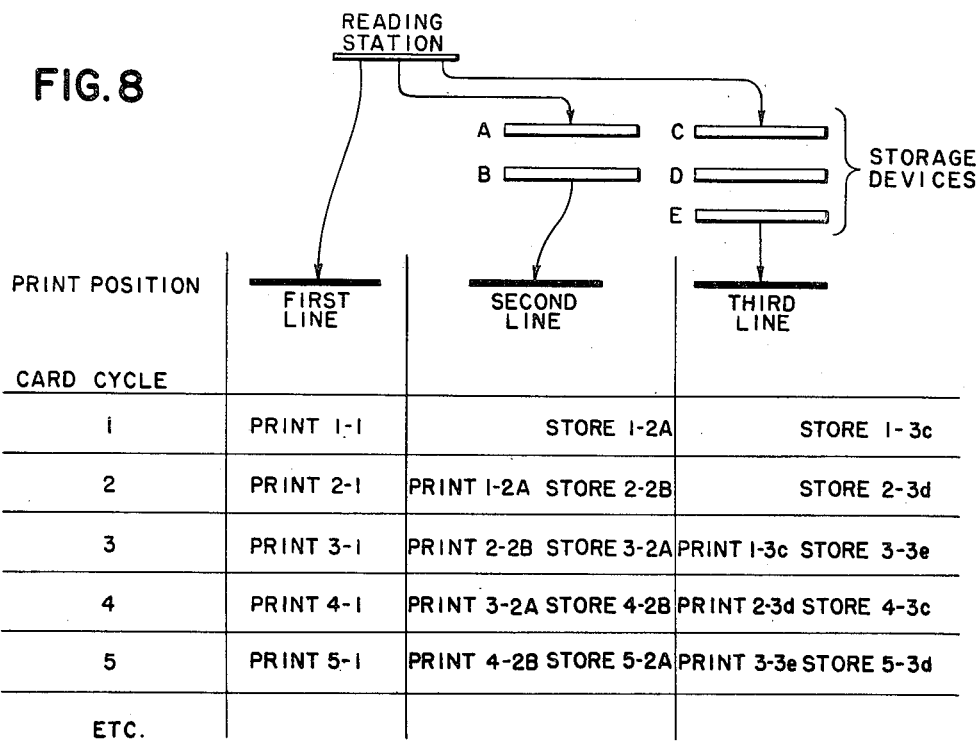

Fig. 7 deals with the conditions arising from the employment of only one card reading station to handle cards, each of which bears all four address portions. Then fourteen storage devices are required because there are times when ten address parts are in storage while four other address parts are being read out of storage for one of the printing operations whereby four address parts are impressed simultaneously.

Fig. 8 is concerned with the use of only one reading station in conjunction with cards bearing three address parts. To print only three lines, five storage devices are employed and called into operation as indicated on the chart.

Figure 9:
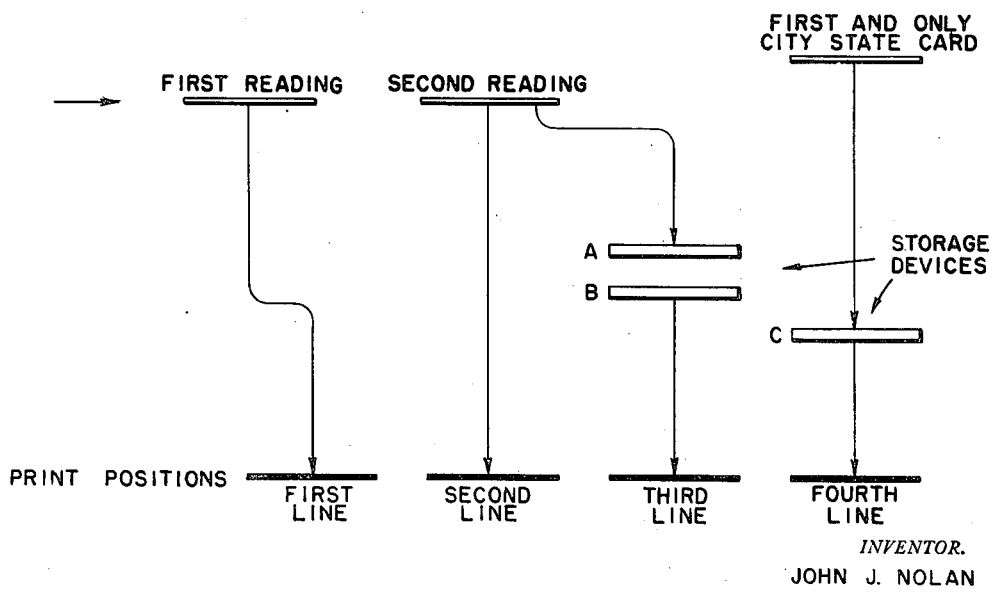

Fig. 9 shows that in some addressing work a common city and state identification may be used for all addresses. That is possible when the address cards are filed according to city and state and related to dick strips for articles bundled together and mailed in city batches for a reduction of postage charges. In such cases, a single "city" heading card as a leader card precedes all other three line address cards. The city and state data are read into storage and held there while being read out on each cycle to control the printing of the fourth line of every address.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for recording on a strip, a plurality of groups of alphabet and numeral printing devices arranged at equal intervals along a common printing line with similar spaces between the groups, means for supporting said strip diagonally across said printing line, means for feeding said strip successively in portions equal to the intervals of spacing of the groups of printing devices and diagonally across them, and means for operating said printing devices between operations of said feeding means to record simultaneously from said plurality of printing devices on a plurality of strip portions and successively on different parts of each strip portion from different printing devices.

2. In a device for recording on a series of print receiving portions of material, a plurality of recording devices spaced across a printer, means for guiding said portions of material diagonally across said printer, means for feeding said portions of material diagonally from one recording device to another, and means for operating said recording devices simultaneously and successively to record on each portion of material by different recording devices.

3. In a device for recording addresses on a dick strip, a plurality of groups of settable alphabet and numeral printing devices arranged across a printer, means for setting said devices to represent different address parts of different addresses, means for feeding said strip diagonally across said printer step by step to bring separate strip portions successively before each group of printing devices, and means for operating said printing devices simultaneously between operations of said feeding means to record on a plurality of strip portions the different address lines of different addresses, and successively on different lines of each strip portion by different groups of printing devices.

4. In a device for recording on parts of a web, means for entering data to be recorded on said web, storage devices operated under control of said entering means for holding certain of said entered data, a plurality of settable recording devices spaced across a printer, means for setting said recording devices under control of said entering means and said storage devices, means for feeding said web diagonally across the printer and from one recording device to another, and means for operating said recording devices to record on each part of the web by all recording devices.

5. In a device for recording on parts of a web, means for entering data to be recorded on said web, a plurality of settable recording devices spaced across a printer, means for setting said recording devices under control of said entering means, means for feeding said web diagonally across the printer and from one recording device to another, and means for operating said recording devices to record on each part of the web by all recording devices.

6. In a device for recording on parts of a web, means for entering data to be recorded on said web, storage devices operated under control of said entering means for holding said entered data, a plurality of settable recording devices spaced across a printer, means for setting said recording devices under control of said storage devices, means for feeding said web diagonally across the printer and from one recording device to another, and means for operating said recording devices to record on each part of the web by all recording devices.

7. In a device for recording on parts of a web, means for entering data to be recorded on said web, a pair of storage devices operated under control of said entering means for holding certain of said entered data, a plurality of settable recording devices spaced across a printer, means for setting said recording devices under control of said entering means and said storage devices, means for alternating the connections of said storage devices so that while one is operated by the entering means the other is controlling the setting of a recording device, means for feeding said web diagonally across the printer and from one recording device to another, and means for operating said recording devices to record from all recording devices on each part of the web.

8. In a device for recording on parts of a web, means for entering data to be recorded on said web, a plurality of storage devices operated under control of said entering means for holding certain of said entered data, a plurality of settable recording devices spaced across a printer, means for setting said recording devices under control of said storage devices, means for alternating the connections of said storage devices so that while some are operated by the entering means others are controlling the setting of a recording device, means for feeding said web diagonally across the printer and from one recording device to another, and means for operating said recording devices to record from all recording devices on each part of the web.

9. In a device for recording on parts of a web, a plurality of recording devices spaced across a printer, means for feeding said web diagonally across the printer with a web part going successively from one recording device to the next, means for operating said recording devices successively to record on each web part from a plurality of recording devices, a punch for perforating a locating hole between said web parts, and means for operating said punch as an incident to each recording operation, said feeding means including a pin feed sprocket wheel for engaging in said web locating holes to space accurately the successive feed of the web parts.

10. In a record controlled machine for printing multiple line addresses on parts of a dick strip web, each of said records bearing indicia representing a plurality of name, street, city and state parts of an address, means for sensing said indicia on a plurality of said records simultaneously including a succession of sensing stations, a plurality of sets of settable type elements arranged to print along a common printing line and spaced at regular intervals along said line, with each set having the same number of elements and with all sets equally spaced, means under control of said sensing means and different sensing stations for adjusting the different sets of type elements to represent different parts of different addresses, means for feeding said web diagonally across said printing line to shift web portions over and upward so that a line of print thereon is line spaced in movement from one set of elements to the next, and means for operating said sets of adjusted type elements successively for recording a line of different address parts of different addresses, each recording operation recording a name on one web portion, a street on the next portion, and a city, state on a third adjacent portion, whereby successive recordings and diagonal shifts of the web results in the recording of one multiple line address for each recording operation of the machine.

11. The combination set forth in claim 10 with said sensing means including storage devices operated thereby for holding data of address portions greater in number than the number of sensing stations employed simultaneously, and means cooperating with said storage devices for controlling certain of said sets of settable type elements other than the sets controlled directly by the record sensing means, whereby addresses of multiple line length may be printed from a limited number of record sensing stations.

12. In a record controlled machine for printing addresses on a web of record material, said records bearing indicia representing a plurality of parts of an address, means for sensing the indicia on said records at a succession of sensing stations, a plurality of sets of settable type elements arranged to print along a common printing line and spaced at regular intervals along said line, with each set having the same number of elements and with all sets spaced similarly from adjacent sets, means under control of the indicia sensing means at different sensing stations for adjusting the different sets of type elements to represent the different parts of an address, means for directing said web of record material diagonally across and longitudinally along said printing line at such an angle that when the web is spaced from one set of elements to the next the printed line thereon is raised one line space, said sets of type impressing thereon simultaneously the name of one address, the street identification of a second address and the state and city identification of a third address, means for perforating a locating hole between address bearing portions of said web, means cooperating with said locating perforations to advance said web successively the distance between adjacent sets of type elements, and means for winding the printed and spaced portions of said web onto a reel.

13. The combination set forth in claim 12 including a pair of storage devices, means for reading out the setting of one of said storage devices, means for reading into one of said storage devices the reading of an address portion from one of said sensing stations, means under control of one of said storage devices for controlling the adjustment of one of said sets of settabe type elements, and means for alternating the connections between the sensing station and read out device so that while the read out of an address portion related to a first card is being directed to one set of type from one of said storage devices, the readin operation is performed from a sensing station in cooperation with a second card and directed into the second storage device, and other alternating connections for control of the association of one or the other of the storage devices with the settable type elements, whereby the storage device cooperating with the read out means at the time is the one connected to the settable type elements.

14. In a machine for printing an address web, a plurality of sets of adjustable type elements arranged in equally spaced groups along a common printing line, a platen for cooperating with said type elements, means for adjusting said type elements to represent different parts of an address, means for impressing said type elements against the platen to cause a series of printing impressions, means for holding said web diagonally across said printing line to receive impressions simultaneously from all groups of type elements, and means for spacing said web successively between printing operations distances equal to the spacing of type element groups.

15. The method of printing address lines on a continuous strip advanced longitudinally with respect to the length of the lines of address print, comprising the steps of arranging a plurality of groups of settable type in evenly spaced relationship and aligned to print along the same printing line, of shifting the address web step by step diagonally across said printing line a distance equal to the total spacing of printing groups, the inclination of the diagonal movement being an angle the sine of which is equal to the height of line spacing divided by the length of spacing movement.

16. The method of printing a dick strip as a continuous narrow strip bearing grouped lines of address at intervals longitudinally along said strip, comprising the steps of arranging groups of settable type equally spaced along a common printing line, of setting said type to represent names in one group, street identification in another group and state and city identification in the third group, of moving said strip diagonally across said printing line at intervals step by step, of impressing simultaneously the impressions of all type groups, whereby the impressions on the web will represent the name of one address, the street of another address and the state of a third address simultaneously, said step of movement of said strip being alternated with the setting and impressing of the type in order to provide successive recordings of one complete address for each recording operation.

References Cited in the file of this patent

UNITED STATES PATENTS

| Number | Name | Date |
| --- | --- | --- |
| 1,400,631 | Smith | Dec. 20, 1921 |
| 1,745,994 | Hubbard | Feb. 4, 1930 |
| 1,909,571 | Carroll | May 16, 1933 |
| 1,945,041 | Daly | Apr. 10, 1934 |
| 1,978,893 | Carroll et al. | Oct. 30, 1934 |
| 2,066,029 | Carroll et al. | Dec. 29, 1936 |
| 2,152,841 | Edmunds | Apr. 4, 1939 |
| 2,168,364 | Schaefer | Aug. 8, 1939 |
| 2,202,958 | McFarland | June 4, 1940 |
| 2,240,667 | Paris | May 6, 1941 |
| 2,348,059 | Daly | May 2, 1944 |
| 2,537,172 | Swenson | Jan. 19, 1951 |
| 2,565,295 | Booten | Aug. 21, 1951 |
| 2,566,932 | Dayger | Sept. 4, 1951 |
| 2,569,829 | Rabenda | Oct. 2, 1951 |
| 2,580,729 | Carroll | Jan. 1, 1952 |
| 2,597,162 | Meehan | May 20, 1952 |
| 2,709,511 | Dicke | May 31, 1955 |